United States Patent

Votoupal et al.

(10) Patent No.: US 9,660,455 B2
(45) Date of Patent: May 23, 2017

(54) SYSTEM AND METHOD FOR INCREASING EFFICIENCY OF GENSETS IN MICRO-GRID SYSTEMS

(71) Applicant: Caterpillar Inc., Peoria, IL (US)

(72) Inventors: John Joseph Votoupal, Hudson, IL (US); Darrin Johnston, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 857 days.

(21) Appl. No.: 14/045,193

(22) Filed: Oct. 3, 2013

(65) Prior Publication Data

US 2015/0097437 A1    Apr. 9, 2015

(51) Int. Cl.
| | | |
|---|---|---|
| H02J 1/00 | (2006.01) | |
| H02J 3/48 | (2006.01) | |
| H02J 3/38 | (2006.01) | |

(52) U.S. Cl.
CPC ............ *H02J 3/48* (2013.01); *H02J 3/381* (2013.01); *Y02T 10/166* (2013.01); *Y10T 307/718* (2015.04)

(58) Field of Classification Search
CPC ......... H02J 3/48; H02J 3/381; Y10T 307/718; Y02T 10/166
See application file for complete search history.

(56) References Cited

U.S. PATENT DOCUMENTS

| | | |
|---|---|---|
| 5,142,868 A | 9/1992 | Woon et al. |
| 7,047,743 B1 | 5/2006 | Stahlhut et al. |
| 2004/0046458 A1 | 3/2004 | Mackay |
| 2008/0121218 A1 | 5/2008 | Algrain |
| 2009/0140576 A1* | 6/2009 | Yu .............................. H02J 3/28 307/66 |
| 2010/0094490 A1 | 4/2010 | Alston et al. |
| 2010/0148518 A1 | 6/2010 | Algrain |
| 2010/0262308 A1 | 10/2010 | Anderson et al. |
| 2012/0323396 A1 | 12/2012 | Shelton et al. |
| 2013/0055711 A1 | 3/2013 | Hofer et al. |
| 2014/0254227 A1* | 9/2014 | Hantschel ............... H02J 3/383 363/131 |
| 2015/0292784 A1* | 10/2015 | Yamanis .................. H02J 3/381 62/236 |

FOREIGN PATENT DOCUMENTS

WO    2012-135258 A2    10/2012

* cited by examiner

*Primary Examiner* — Daniel Cavallari
(74) *Attorney, Agent, or Firm* — Miller, Matthias & Hull

(57) ABSTRACT

A system and method for running a plurality of gensets in parallel in a micro-grid system is disclosed. The system and method may include at least one genset configured to run at a load factor of greater than sixty percent, the number of the at least one genset supplying power at any given time including a minimum or less than minimum number of gensets capable of meeting a demand imposed by a load. The system and method may also include a turbo compounding system associated with at least one of the at least one genset, each of the electric turbo compounding systems configured to increase fuel efficiency of the at least one genset.

12 Claims, 5 Drawing Sheets

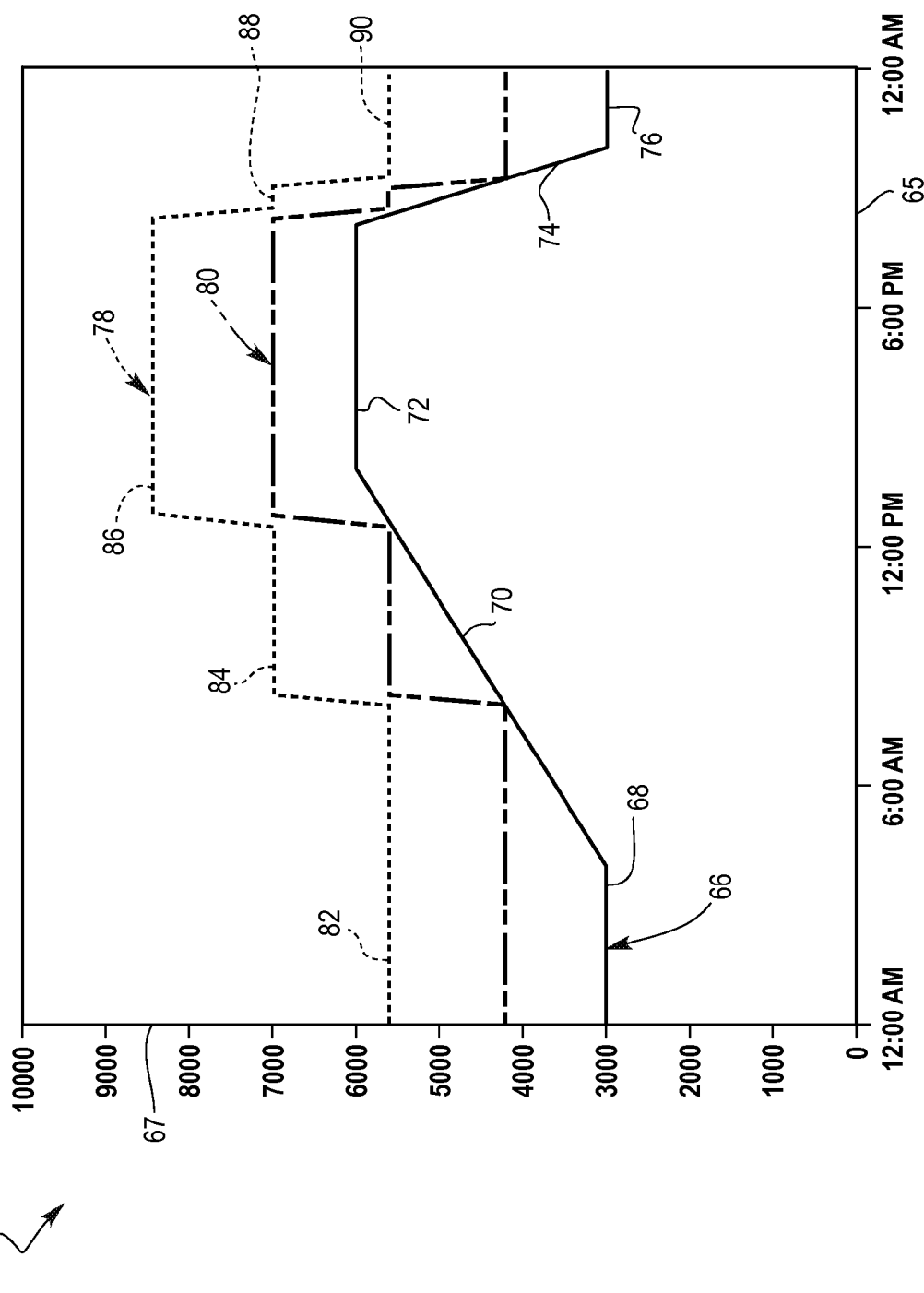

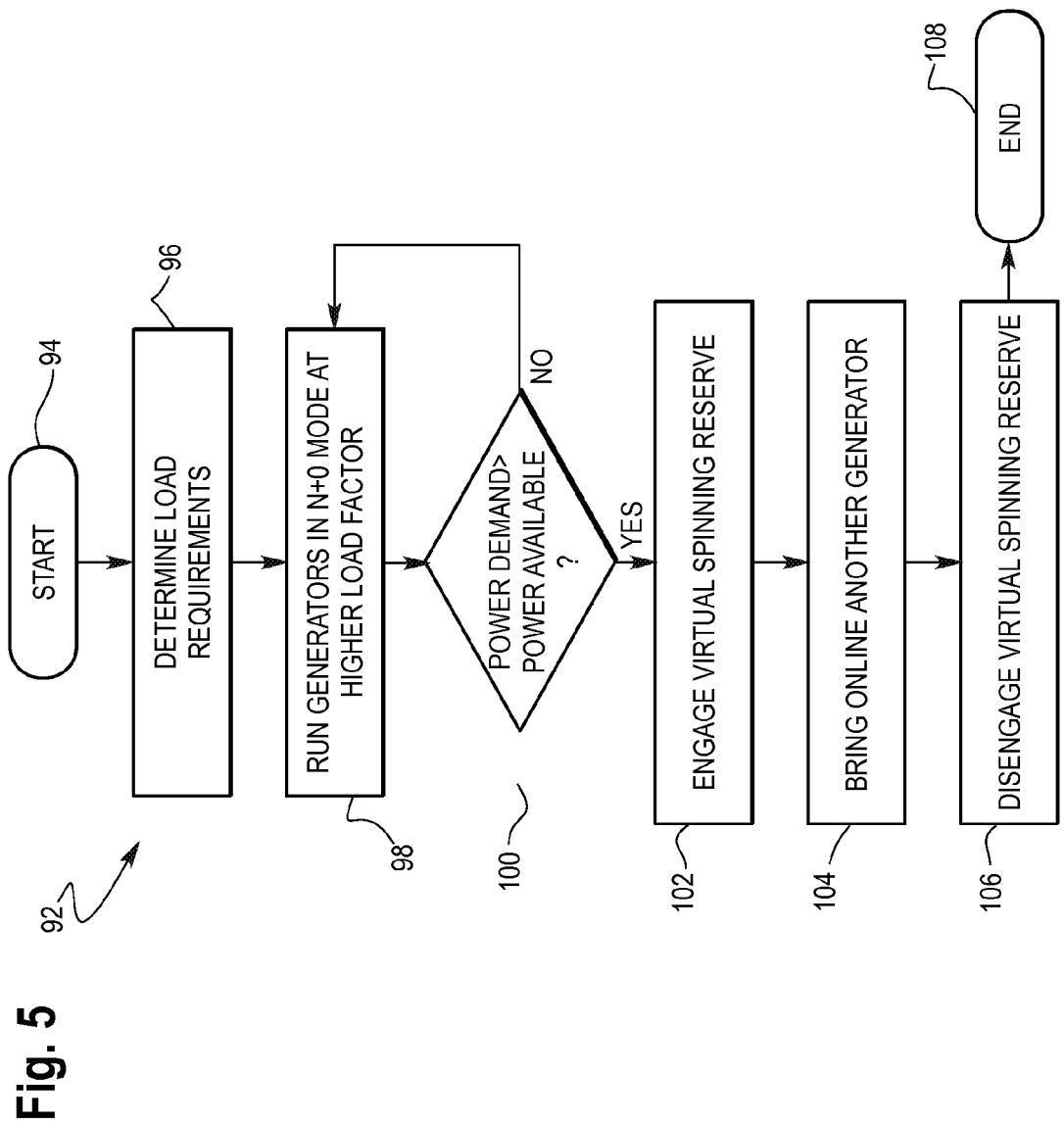

SYSTEM AND METHOD FOR INCREASING EFFICIENCY OF GENSETS IN MICRO-GRID SYSTEMS

TECHNICAL FIELD

The present disclosure relates generally to micro-grid systems and, more particularly, relates to systems and methods for increasing the efficiency of gensets in micro-grid systems.

BACKGROUND

A micro-grid system is a small electrical grid having a plurality of electricity generating devices that may be configured to service a localized power load. Among other components, the micro-grid system may include a plurality of electrical generators (gensets) running in parallel that service the load. When the plurality of gensets are the primary sources supplying power to the load, these gensets are generally run in an n+1 (or greater than n+1) arrangement. This means that at least one additional genset than the number of gensets needed to meet the load demand is run to satisfy that demand. By virtue of running the one or more extra gensets, the micro-grid system is able to maintain voltage and frequency of power within specification with minimum to no disruptions to the power load when block loads are added to the micro-grid system.

Furthermore, in some paralleled genset operations running in the n+1 arrangement, the gensets may be running at only about a sixty percent (60%) load factor. Load factor may be defined as an average load divided by a peak load in a specified amount of time. One reason for operating the gensets at a lower load factor could be that at high load factors, the response of the micro-grid system when the gensets encounter block loads may not be sufficient. However, it is well known that fuel efficiency of a genset increases when the genset is run closer to a full load capacity, that is, the fuel efficiency increases at higher load factors. Thus, running the gensets at only a sixty percent (60%) load factor may not be very fuel efficient.

Additionally, the engines of the gensets in some micro-grid systems may have associated therewith a turbo compounding system that may increase fuel efficiency at least somewhat by converting heat and airflow energy from engine exhaust gasses of the gensets into electrical, mechanical or other type energy to provide additional power. However, turbo compounding increases fuel efficiency the greatest when the engine of the gensets is running close to full load. Therefore, with the gensets running at only about sixty percent (60%) load factor, turbo compounding may not be very advantageous.

U.S. Pat. No. 7,047,743 discloses a system of using electric turbo compounding with a genset to supply power to a grid. Specifically, the patent teaches a turbo-generator, the electric output of which is combined with the electric output of an engine powered generator to increase total power output for a given size and to improve fuel efficiency. The combined power is then delivered to a transmission line. Although the above patent teaches using an electric turbo compounding system with a genset to increase total power output, the patent does not teach increasing the load factor of the genset itself. As discussed above, without increasing the load factor of the genset, the electric turbo compounding system does not provide any significant fuel savings. Furthermore, it appears that the engine powered generator in the '743 patent is operated at the conventional n+1 configuration.

It would accordingly be beneficial if a mechanism for improving the operating efficiency and fuel efficiency of the gensets in a micro-grid system could be developed. It would additionally be beneficial if such a mechanism could operate the gensets at a higher load factor while providing sufficient response in transient conditions.

SUMMARY

In accordance with one aspect of the present disclosure, a genset system is disclosed. The genset system may include at least one genset configured to run at a load factor of greater than sixty percent and the number of the at least one genset supplying power at any given time may include a minimum or less than minimum number of gensets capable of meeting a power demand imposed by a load. The genset system may also include a turbo compounding system associated with at least one of the at least one genset, each of the turbo compounding systems configured to increase fuel efficiency of the at least one genset.

In accordance with another aspect of the present disclosure, a method for increasing efficiency of gensets in a micro-grid system is disclosed. The method may include providing a plurality of gensets in parallel and configured to supply power to a load. Each of the plurality of gensets may be configured to run at a load factor of greater than sixty percent and the number of the plurality of gensets supplying power at any given time may include a minimum or less than minimum number of gensets capable of meeting a power demand imposed by the load. The method may also include determining if the power demand exceeds the power supplied by the plurality of gensets and engaging an energy storage unit connected at least indirectly to the plurality of gensets to provide power to the load if the power demand indeed exceeds the power supplied by the plurality of gensets. The method may continue to provide power through the energy storage unit until another one of the plurality of gensets is ready to supply power to the load.

In accordance with yet another aspect of the present disclosure, a micro-grid system is disclosed. The micro-grid system may include a plurality of gensets configured to run in parallel at a load factor of greater than sixty percent to service a load with the number of the plurality of gensets supplying power at any given time including a minimum or less than minimum number of gensets capable of meeting a power demand imposed by the load. The micro-grid system may also include a turbo compounding system associated with at least one of the plurality of gensets, each of the turbo compounding systems configured to increase fuel efficiency of the plurality of gensets. The micro-grid system may further include an energy storage unit connected at least indirectly to the plurality of gensets, the energy storage unit configured to provide power to the load when the power demand exceeds the power supplied by the plurality of gensets.

These and other aspects and features of the present disclosure will be more readily understood upon reading the following description when taken in conjunction with the accompanying drawings.

BRIEF DESCRIPTION OF THE DRAWINGS

FIG. 4 is a graphical representation illustrating an exemplary load profile over a twenty-four hour period and comparing genset capacity of the genset configuration of the micro-grid system of FIG. 1 relative to the conventional genset configuration of FIG. 2 over the twenty-hour period; and FIG. 5 is a flowchart outlining steps of operating the gensets of the micro-grid system of FIG. 1 to increase efficiency thereof, in accordance with at least some embodiments of the present disclosure.

While the present disclosure is susceptible to various modifications and alternative constructions, certain illustrative embodiments thereof will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION

The present disclosure provides a micro-grid system having a plurality of gensets running in parallel to service a load. Each of the plurality of gensets may be run at an average load factor much higher than heretofore possible while still maintaining rated frequency and voltage requirements during transients and block loads. An electric turbo compounding system, or other types of turbo compounding systems, may be used with at least one of the plurality of gensets to provide improved fuel economy relative to a conventional genset, particularly when the gensets are operated at the higher load factors. Energy storage may be utilized to enable the electric turbo compounded plurality of gensets to run at the higher load factors and to maintain the frequency and voltage of the plurality of gensets during transients and block loads.

Figure 1:
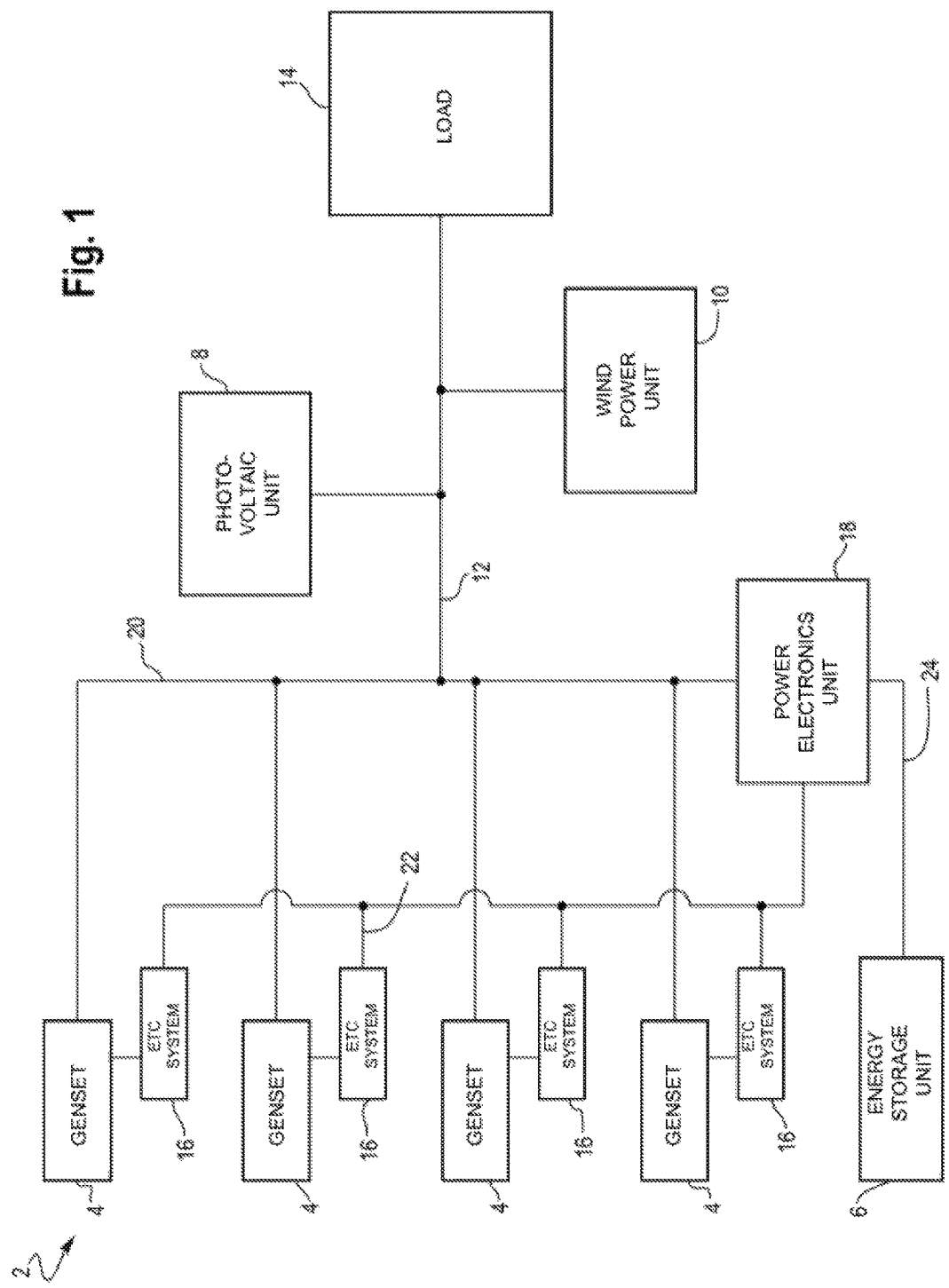
FIG. 1 is a schematic diagram of an exemplary micro-grid system, constructed in accordance with at least some embodiments of the present disclosure.

Referring now to FIG. 1, a schematic diagram of an exemplary micro-grid system 2 is shown, in accordance with at least some embodiments of the present disclosure. As shown, the micro-grid system 2 may include a plurality of gensets 4, an energy storage unit 6, a photo-voltaic unit 8 and a wind power unit 10 providing energy to a grid 12 servicing a load 14. It will be understood that only those components that are necessary for a proper understanding of the present disclosure have been shown and described here. Nevertheless, several other components, such as inverters, rectifiers, controllers, etc., that are commonly used in combination or conjunction with micro-grid systems are contemplated and considered within the scope of the present disclosure.

Furthermore, the micro-grid system 2 may be employed in a variety of applications. For example, the micro-grid system 2 may be employed on islands, remote mining sites, remote villages, military bases, ships, residential neighborhoods, group of buildings or any other site that is off-grid or not connected to a public utility line or where power efficiency and independence is desired. In at least some embodiments, the load 14 on the aforementioned applications may vary from about thirty kilowatts (~30 kW) to about thirty megawatts (~30 MW) and range typically around fifty or around sixty hertz (~50 or ~60 Hz) of alternating current (AC) power. It will be understood that this load rating range is merely exemplary and may vary from one application to another and be higher or lower than the stated range above.

Additionally, although the micro-grid system 2 is shown to only have the plurality of gensets 4, the energy storage unit 6, the photo-voltaic unit 8 and the wind power unit 10 connected to the load 14 via the grid 12, in at least some other embodiments, the number and types of power supplying sources in the grid may vary. For example, in addition to or instead of the components described above, the micro-grid systems of at least some embodiments may employ geothermal power, hydroelectric power, fuel cell power, micro-turbine power and other types of power supplying sources as well. Typically, the number and type of power supplying sources used within the micro-grid system 2 may vary depending upon the application, the power supplying capacity of each component within the micro-grid system, as well as the location where the micro-grid system may be installed.

Now with respect to the gensets 4, in at least some embodiments, each of the gensets may be a constant speed generator capable of converting mechanical energy to electric energy and particularly, AC electric energy. While the components of the gensets 4 are not shown, a typical genset may include a primary power source (such as a prime mover) capable of facilitating magnetic interactions between a rotor and a stator to generate electrical energy. Notwithstanding the fact that in the present embodiment, the gensets 4 have been described as being constant speed generators, in at least some embodiments, one or more of the gensets may be variable speed generators.

Additionally, other components that are commonly employed in combination or conjunction with gensets are contemplated and considered within the scope of the present disclosure. Furthermore, although only four of the gensets 4 running in parallel and connected to the grid 12 have been shown, this is merely exemplary. In other embodiments, the number of the gensets 4 may vary to more or less than four depending upon the power generating capacity of each genset, as well as the load requirement imposed on each genset. Moreover, the gensets 4 may be controlled to provide power directly to the grid 12. In at least some embodiments, the power output of each of the gensets 4 may be supplied directly to the grid 12 via a transfer switch (not shown). The transfer switch may ensure that the gensets 4 have the correct frequency, voltage magnitude, and voltage phase before the transfer switch is opened to enable the gensets to supply power to the grid 12.

The gensets 4 may also have associated therewith an electric turbo compounding (ETC) system 16. In at least some embodiments, at least one of the ETC systems 16 may be associated with the engine of each one of the gensets 4, although this may not always be the case. In some embodiments, only certain ones of the gensets 4 may have one or more of the ETC systems 16 associated therewith. The ETC system 16 may be employed to increase the charge density of the associated engines of the gensets 4 during combustion, as well as to increase power output and fuel efficiency of those gensets.

In at least some embodiments, the ETC systems 16 may be a turbo-compounding system configured to increase fuel efficiency by converting heat and airflow energy from engine exhaust gasses into electrical energy. In at least some other embodiments, the ETC system 16 may be a turbo-compounding system configured to convert energy from exhaust gases into mechanical energy. The electrical energy from the ETC system 16 may be used, as discussed below, to supply power to the grid 12, to store energy within the energy storage unit 6 or even supply power to directly power various engine accessories of the gensets 4. Similarly, the mechanical energy from the ETC system 16 may be used to return power to the output shaft of the engine associated therewith. In yet other embodiments, a combination of the electrical and mechanical ones of the ETC system 16 may be used.

Thus, the ETC system 16 (whether electrical or mechanical) may recover energy that would otherwise go out the exhaust pipe of the engines of the gensets 4 in the form of heated gas. Specifically, a typical one of the ETC system 16 may include a turbine driven by exhaust gases of the engine of the gensets 4 to drive a turbo or secondary generator that generates additional AC energy (or through other devices to add power to the output shaft). Thus, the ETC system 16 may provide a mechanism to recover energy from exhaust gases that might otherwise be lost to generate additional electric (or mechanical) power for the grid 12 or to store in the storage device 6. Furthermore and as will be described further below, the ETC system 16 may increase fuel efficiency of the gensets 4 the greatest when the engines of those gensets are run closer to full load.

The electricity generated by the ETC system 16 may be transmitted to the power electronics unit 18 via a bus 22. The power electronics unit 18 may then transfer the power received from the ETC system 16 to the grid 12 to service the load 14. Alternatively, the power electronics unit 18 may direct the power from the ETC system 16 to the energy storage unit 6 for use later. In at least some embodiments, each of the ETC system 16 may have associated therewith its own power electronics unit serving a similar functionality as the power electronics unit 18. Each of those individual power electronics units may be connected to the energy storage unit 6, as well as to the grid 12 in a manner described above.

Similar to the ETC system 16, the gensets 4 may also be connected to the power electronics unit 18 via a bus 20 to direct any excess power generated by the gensets 4 to the energy storage unit 6. Although not shown, in at least some embodiments, the photo-voltaic unit 8, the wind power unit 10, as well as other energy generating components on the grid 12 may also be connected to the power electronics unit 18.

In at least some embodiments, the power electronics unit 18 may be a bi-directional inverter. In other embodiments, the power electronics unit 18 may be any of a variety of commonly used device(s) and/or controllers capable of receiving a three phase power supply from the gensets 4, the ETC system 16 and other components on the grid 12 and, transferring that power to the grid 12 to service the load 14. Further, the power electronics unit 18 may also be capable of matching the voltage phase, frequency and voltage magnitude of the power received from the ETC systems 16 with the voltage phase, frequency and voltage magnitude of the power received from the gensets 4 to maintain the power supplied to the grid 12 from the ETC system within acceptable specification.

With respect to the buses 20 and 22, each of those buses may be an alternating current (AC) bus and particularly, a three phase AC bus suitable for transferring AC power from the gensets 4 and the ETC systems 16, respectively, to the power electronics unit 18. Other type of suitable buses or power transmission lines for relaying AC power from the gensets 4 and the ETC systems 16 to the power electronics unit 18 may be used in other embodiments.

Referring still to FIG. 1, each of the gensets 4 may be configured to run at a higher load factor compared to conventional gensets to achieve relatively more fuel savings and better performance. For example, each of the gensets may be run at a load factor of about eighty percent to about eighty five percent (~80-85%). The gensets 4 may be able to run at the higher load factors by virtue of using the energy storage unit 6. The energy storage unit 6 may be any of a wide variety of energy storage devices, such as, batteries, ultra-capacitors, flywheels, hydraulic devices, etc. In some embodiments, the energy storage unit 6 may be suitable for providing approximately between two kilowatt-hours (~2 kW-h) and one thousand kilowatt-hours (~1000 kW-h) of power to the grid 12. In other embodiments, the capacity of the energy storage unit 6 may vary depending upon the size of the energy storage unit, as well as the application in which it is used.

The addition of the energy storage unit 6 to the installation of the gensets 4 may provide a "virtual spinning reserve" that may be utilized when the load requirements or power demand exceed the power being generated by the genets 4 and the other power generating components on the grid 12. Specifically, when the gensets 4 are running at closer to full load, and additional load is added to the grid 12, there may not be enough power available to meet the new increased load, such that another genset may be required on the grid. Bringing another genset online and matching the frequency, voltage magnitude, and voltage phase of that genset before that genset supplies power to the grid 12 may consume some time. While the additional generator is being prepared, the gensets 4 that are already connected to the grid 12 may not have the capacity to meet the increased load 14 on the grid 12 thereby causing the frequency and voltage magnitude of those gensets to drop out of specification. To prevent such drop in frequency and voltage magnitude, additional power from the energy storage unit 6 may be supplied on to the grid 12 through the power electronics 18.

Thus, the energy storage unit 6 may be configured to provide power needed until another genset can be brought onto the grid 12 to meet the increased load demand. Additionally, the closer to full load the gensets 4 operate, the slower they may be to provide additional power when block loads are added. The storage unit 6 may again assist the gensets 4 by providing supplemental power to the grid 12, thereby ensuring that the frequency and voltage magnitude of the gensets 4 do not fall out of specification.

To provide power to the grid 12, the energy storage unit 6 may be connected to the power electronics unit 18 via an AC bus 24. Specifically, the power electronics unit 18 may be configured to receive power from the energy storage unit 6 and relay that power to the grid 12 when desired. The power electronics unit 18 may also facilitate charging of the energy storage unit 6 via the gensets 4 and/or the ETC system 16. The energy storage unit 6 may typically be charged when all of the gensets 4 in the micro-grid system 2 are functioning properly.

Specifically, when the gensets 4 or the other components on the grid 12 generate more power than required by the load 14, at least some of that excess power may be directed to the power electronics 18 through the bus 20. The power electronics unit 18 may store that power in the energy storage unit 6. The storage unit 6 may also be used as a power sink when some of the load 14 is taken off the grid 12. When a block load turns off, the amount of power needed on the grid 12 may change instantly. This may cause a frequency and/or voltage magnitude surge causing the gensets 4 to go over the specification (as the engines may not be able to respond instantly to a power demand change). At least some of the excess power may be directed into the energy storage unit 6 via the bus 20 and the power electronics unit 6 to minimize the surge.

Furthermore, since the energy storage unit 6 may be capable of supplying power to the grid 12, the energy storage unit may enable a reduction in the number of the gensets 4 that may be supplying power in the micro-grid system 2. Specifically, the energy storage unit 6 may enable the micro-grid system 2 to operate only a minimum number of gensets that may be needed to meet load demand at any given time. Thus, by adding energy storage via the energy storage unit 6 to provide substitute power when needed to meet voltage and frequency specifications, the gensets 4 may be operated in an n+0 configuration, that is, a configuration in which an additional genset beyond the minimum number required to meet the load requirements is not needed. In at least some embodiments, the energy storage unit 6 may even facilitate operating the gensets 4 in an n−1 or n−2 configuration.

Moreover, by virtue of using the ETC systems 16 along with the energy storage unit 6, those gensets may be operated at higher load factors for increased fuel efficiency. For example, in at least some embodiments, the energy storage unit 6 and the ETC systems 16 may enable the gensets 4 to run at higher load factors such as about eighty percent to about eighty five percent (~80-85%) of full load capacity.

INDUSTRIAL APPLICABILITY

In general, the present disclosure sets forth a micro-grid system having multiple gensets running in parallel to provide power to a load. The micro-grid system 2 may also include an energy storage unit for meeting power specifications when block loads are applied, thereby enabling the gensets to be run at a higher load factor for increased fuel efficiency. At least some of the gensets may also have associated therewith an electric turbo compounding (ETC) system to increase fuel efficiency even further. Thus, by using the energy storage unit and the ETC systems, the gensets may be run at a load factor of about eighty percent to eighty five percent (~80-85%) of full load capacity, greatly increasing fuel efficiency. The micro-grid system may also include a power electronics unit to manage power between the gensets, the energy storage unit, the ETC systems and the grid. Alternate energy producing components such as wind power units and photovoltaic units may be provided within the micro-grid system as well.

Figure 2:
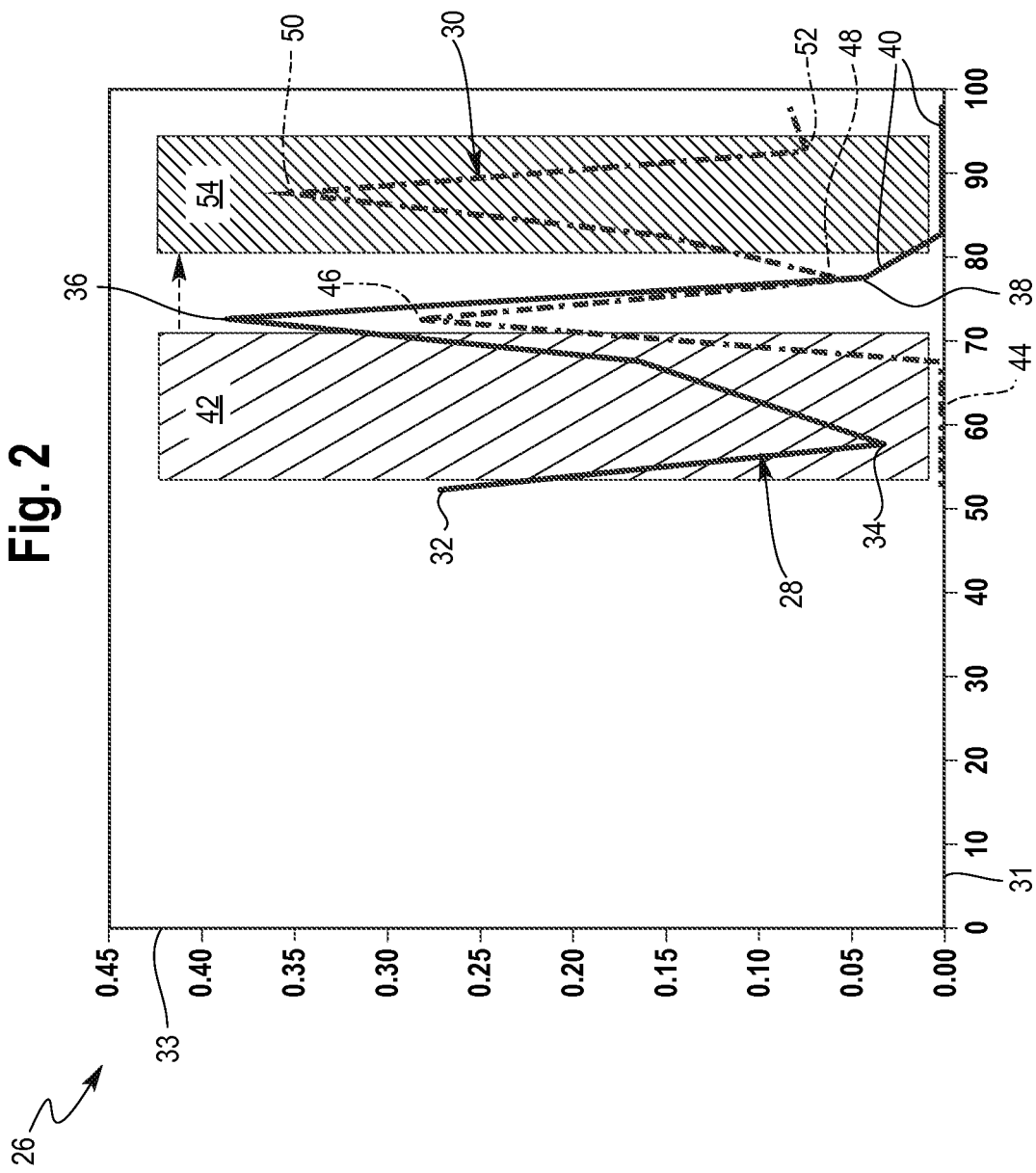
FIG. 2 is an exemplary histogram comparing a conventional genset configuration with a genset configuration employed by the micro-grid system of FIG. 1.

Turning now to FIG. 2, an exemplary histogram 26 comparing the load factors of a conventional genset with one of the gensets 4 is shown, in accordance with at least some embodiments of the present disclosure. The histogram 26 may include a conventional plot 28 illustrating the load profile of a conventional genset in an n+1 configuration and a current plot 30 illustrating the load profile of one of the gensets 4 running in an n+0 configuration with the virtual spinning reserve provided by the energy storage unit 6 and the ETC system 16. As shown, the histogram 26 plots genset load as a percentage of its rated value on X-axis 31 against a frequency of occurrence during a twenty hour load profile on Y-axis 33. In other words, the conventional plot 28 and the current plot 30 represent the percentage of time that each of the respective gensets spends at each load factor.

With specific reference to the conventional plot 28, it can be seen that a conventional genset in an n+1 configuration in any given twenty hour period spends about twenty seven percent (27%) of the time at a load factor of about fifty four percent (54%) represented by plot point 32 and about three percent (3%) of the time at a load factor of about fifty eight percent (58%) represented by plot point 34. As also illustrated by plot point 36, the conventional genset typically operates at about seventy two percent (72%) load factor for about thirty eight percent (38%) of the time, while the highest load factor that the conventional genset generally operates is about seventy eight percent (78%) for only about five percent (5%) of the time in a given day, as represented by plot point 38. Furthermore, the conventional genset spends almost no time (or minimal time) at load factors higher than seventy percent (78%), as shown by plot portion 40. Thus, a conventional genset in any given twenty hour period only operates at an average load factor of about sixty six percent (66%), represented by block 42.

In contrast to the conventional plot 28 of a conventional genset, the current plot 30 and particularly, plot portion 44 of the current plot 30 shows that the gensets 4 spend almost no time at load factors less than about sixty eight percent (68%). Furthermore, the gensets 4 may spend only about twenty eight percent (28%) of the time at a load factor of about seventy two percent (72%), as shown by plot point 46—a stark contrast from the conventional genset, which spends the maximum amount of time (38%) at this load factor (the plot point 36).

Similar to the plot point 38 of the conventional plot 28, the gensets 4 typically spend only about five percent (5%) of their operating time at the load factor of about seventy eight percent (78%), as shown by plot point 48. Rather, the gensets 4 spend most of their running time (35% of the time) at a load factor of about eighty eight percent (88%) (plot point 50), while about seven percent (7%) of their time at a load factor of about ninety percent (90%) (plot point 52). Thus, the gensets 4 have an average load factor of about eighty three percent (83%), represented by block 54.

Accordingly, it may be seen from the conventional plot 28 and the current plot 30 that the gensets 4, by virtue of the ETC system 16 and the virtual spinning reserve provided by the energy storage unit 6, may be run at an average load factor that is at least fifteen percent (15%) more than the conventional gensets. In addition, the gensets 4 may be run at an n+0 configuration in contrast to the conventional gensets, which are run at an n+1 configuration. Therefore, the gensets 4 provide increased fuel efficiency, as shown in FIG. 3 below.

Figure 3:
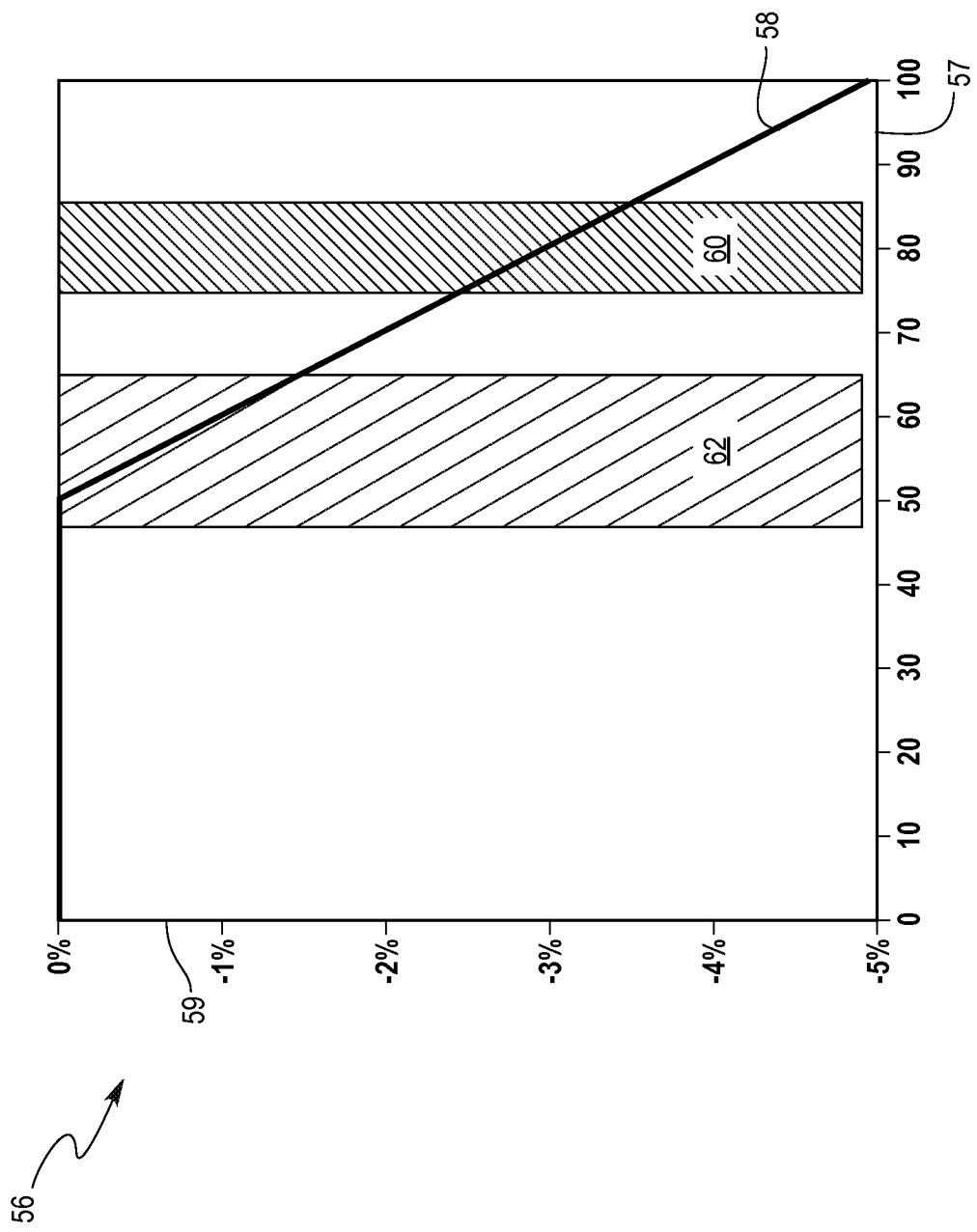
FIG. 3 is an exemplary graphical representation comparing fuel consumption of the genset configuration of the micro-grid system of FIG. 1 relative to the conventional genset configuration of FIG. 2.

Specifically in FIG. 3, a graphical representation 56 illustrating a decrease in fuel consumption of an engine of a genset having the ETC system 16 compared to an engine without the ETC system as a function of load is shown, in accordance with at least some embodiments of the present disclosure. Specifically, the graphical representation 56 shows engine load or load factor as a percent of the rated value on X-axis 57 against fuel consumption on Y-axis 59. As shown by plot 58, as the load on the engine decreases, the fuel consumption increases. Thus, gensets are generally more fuel efficient at higher load factors. Since the gensets 4 by virtue of the energy storage unit 6 and the ETC systems 16 are capable of running at higher load factors, as shown by block 60, those gensets are more fuel efficient compared to conventional gensets that operate at lower loads, as shown by block 62. The fuel efficiency of the gensets 4 is further enhanced by the ETC system 16 since the ETC system operates more efficiently at higher load factors.

Referring now to FIG. 4, an exemplary graphical illustration 64 comparing the number of conventional gensets with the number of the gensets 4 that may be needed to fulfill the load requirements in a typical day is shown, in accordance with at least some embodiments of the present disclosure. Specifically, X-axis 65 shows various times within any given twenty four hour period, while Y-axis 67 shows power in kilowatts (kW) that may be needed by the load 14 during the day.

An exemplary set of requirements of the load 14 as they vary throughout the day are shown by plot 66. In particular, plot portion 68 of the plot 66 shows that the load requirements on the load 14 are low and stable at about three thousand kilowatts (~3000 kW) between midnight and about five o'clock in the morning. Thereafter, the load gradually ramps up during the day from about three thousand kilowatts (~3000 kW) to about six thousand kilowatts (~6000 kW), as shown by plot portion 70. In plot portion 72, the load 14 remains stable at about six thousand kilowatts (~6000 kW) for most of the day before gradually reducing again to about three thousand kilowatts (~3000 kW) at around eleven o'clock at night in plot portion 74. The load 14 again stabilizes at about three thousand kilowatts (~3000 kW) for the rest of the night, as shown by plot portion 76 with the load cycle (the plot portions 68, 70, 72, 74 and 76) repeating again the next day.

To meet these varying load requirements of the plot 66, varying number of gensets may be run throughout the day to meet those requirements. Plot 78 shows the number of gensets in a conventional n+1 configuration that may be needed to meet the load requirements of the plot 66, while plot 80 shows the number of the gensets 4 running at a higher load factor (e.g., at an average load factor of about 83%) in an n+0 configuration with the ETC system 16 and the energy storage unit 6 that may be needed to meet the load requirements.

Referring specifically to the plot 78 first, plot portion 82 of the plot shows that conventional gensets capable of providing a combined power of about fifty six hundred kilowatts (~5600 kW) may be run to meet a load demand of between three thousand kilowatts (3000 kW) and about four thousand kilowatts (4000 kW) for the plot portion 68 and part of the plot portion 70. If an exemplary conventional genset is rated for fourteen hundred kilowatts (1400 kW), then four of the conventional gensets may be run to provide a power of about fifty six hundred kilowatts (~5600 kW). As the load requirements start to ramp during the day (as shown in the plot 66), two additional conventional gensets may be brought online incrementally, as illustrated from plot portions 84 and 86 to meet the increased load demands represented by the plot portions 70 and 72. At this point, six conventional gensets capable of providing a total power of about eight four hundred kilowatts (~8400 kW) are online servicing a load of only about six thousand kilowatts (~6000 kW).

Then, as the load requirements start to decrease towards the late evening into the night (the plot portion 74), two of the conventional gensets are gradually brought off-line to reflect the reduced load requirements, as shown in plot portions 88 and 90, leaving four gensets online to service about a four thousand to three thousand kilowatt (4000-3000 kW) load. Thus, using the conventional n+1 genset approach, an additional genset is always run to fulfill the load requirement that can be fulfilled even without that additional genset. The additional genset is run to allow for any transient conditions (e.g., when a genset mal-functions) that may occur unexpectedly. Further and as understood from FIG. 2, each of those conventional gensets are run at an average load factor of only about sixty six percent (66%).

In contrast and as shown by the plot 80, by using the energy storage unit 6 and the ETC system 16, for every plot portion (e.g., the plot portions 82-90) of the plot 78, one less number of the gensets 4 is needed to meet the corresponding load requirements of the plot portions 68-76. For example, instead of running four gensets to provide about three thousand kilowatts of power (~3000 kW) as in the plot portion 82, the gensets 4 (similarly rated as the conventional gensets) may satisfy that power requirement with only three gensets with each of the three gensets running at a higher load factor. Similarly, one less number of the gensets 4 may be needed to satisfy the power requirement in every one of the plot portions of the plot 80 corresponding to the plot portions 84-90 of the plot 78. Thus, the number of the gensets 4 that are online and supplying power at a time include only a minimum number of gensets that are needed to satisfy the load requirement.

It will be understood that the number of conventional gensets in plot 78 and the gensets 4 in plot 80 used to meet the power requirements of the plot 66 are merely exemplary. The number of gensets in each of those plots may vary depending upon the power requirements imposed on the gensets, as well as the rating of each of the gensets. However, for similarly rated gensets, the gensets 4 may be operated in an n+0 configuration compared to the n+1 configuration of the conventional gensets.

Turning now to FIG. 5, an exemplary flowchart 92 outlining the steps of running the gensets 4 is shown, in accordance with at least some embodiments of the present disclosure. As shown, after starting at a step 94, the load requirements to be met by the gensets 4 may be determined at a step 96. The load requirements may vary depending upon the load 14 of the micro-grid system 2. These load requirements may be determined by a controller, not shown, within the micro-grid system 2. Once the load requirements are known, the gensets 4 may be run in an n+0 configuration to satisfy those requirements at a step 98.

Specifically, the gensets 4 may be operated in an n+0 configuration, with each of the gensets 4 running at a higher load factor. As discussed above, because the energy storage unit 6 may be capable of providing power when the power demand exceeds the power available, the gensets 4 do not require an extra running genset to account for the increased power demand conditions. Thus, the gensets 4 increase fuel efficiency resulting from fuel savings associated with running one less genset. Additional fuel savings occur by running each of the gensets in the n+0 configuration at a higher load factor. Using the ETC system 16 in conjunction with the gensets 4 increases fuel efficiency even more. In at least some embodiments, the gensets 4 may even be run at an n−1 or n−2 configuration with the energy storage unit 6 supplementing the power to the grid 12 from the operating ones of the gensets.

Next, at a step 100 it may be determined whether the power demand is greater than the power available from the gensets 4 and the other power generating components of the grid 12. As discussed above, the power demand may exceed the power available when a block load, such as a component with heavy power consumption, is added to the grid 12. If the power demand does not exceed the power available, then the gensets 4 continue to run at the step 98 at the n+0 configuration until the power demand exceeds the power available. When the power demand indeed goes beyond the power available to the grid 12, then at a step 102, the virtual spinning reserve may be engaged. In other words, the energy storage unit 6 may be employed to provide supplemental power to account for the difference between the power available from the gensets 4 (and the other power generating components) and the power demand. Since the energy storage unit 6 may be capable of meeting the power specifications of the load 14, the micro-grid system 2 may continue to run seamlessly without any problems or disruptions.

While the energy storage unit 6 may be servicing the load 14, the micro-grid system 2 may bring another one of the gensets 4 online to provide additional power to the grid 12 at a step 104. The running of the energy storage unit 6 may give the micro-grid system 2 enough time to start another genset and match the frequency and voltage magnitude of that genset with the other running gensets without disrupting the power supply to the load 14. Once the additional genset is up and running, the virtual spinning reserve provided by the energy storage unit 6 may be disengaged at a step 106. The process ends at a step 108.

Thus, the ETC system 16 and the energy storage unit 6 provide a mechanism for improving the operating and fuel efficiency of the gensets 4. Specifically, by virtue of shutting down unneeded genset(s) and operating the remaining gensets at a higher load factor (again, an average load factor of about eighty three percent) in an n+0 configuration, the micro-grid system 2 increases the fuel efficiency of the gensets 4. Depending upon the load cycle and the engine model of the gensets 4, fuel savings of around two percent to ten percent may be obtained per operating genset.

Furthermore, the genset response may improve as well due to lower particulate emissions and slower transients placed on the engines of the gensets 4 particularly because the efficiency of the gensets generally increases, sometimes significantly, at higher load factors. Moreover, the micro-grid system 2 may be able to provide grid-quality power in off-grid applications with near zero voltage and frequency deviation during transient events due to using the power electronics unit 18 to match the voltage, frequency and phase of the energy storage unit 6 with that of the gensets 4.

Additionally, by virtue of using the energy storage unit 6 to service the load 14 in times of transient events, the micro-grid system 2 may enable energy storage in the energy storage unit during times of excess (e.g., when all the gensets 4 are running properly) and using the stored energy in times of need. The micro-grid system 2 may employ other mechanisms of generating power, such as the photo-voltaic unit 8 and the wind power unit 10. Therefore, the micro-grid system 2 may permit exploitation of renewables sources of energy. Finally, existing micro-grid systems may be retrofitted with the energy storage unit 6 and the ETC system 16 may be provided on each of the gensets 4 to provide the advantages discussed above.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A method for increasing efficiency of gensets in a micro-grid system, the method comprising:
   providing a plurality of gensets in parallel configured to supply power to a load, each of the plurality of gensets configured to run at a load factor of greater than sixty percent, the number of the plurality of gensets supplying power at any given time including a minimum or less than minimum number of gensets capable of meeting a power demand imposed by the load;
   determining if the power demand exceeds the power supplied by the plurality of gensets; engaging an energy storage unit connected at least indirectly to the plurality of gensets to provide power to the load if the power demand exceeds the power supplied by the plurality of gensets; and
   continuing to provide power through the energy storage unit until another one of the plurality of gensets is ready to supply power to the load.

2. The method of claim 1, wherein providing power through the energy storage unit comprises:
   starting one of the plurality of gensets that is off-line; and
   disengaging the energy storage unit when the off-line one of the plurality of gensets comes on-line.

3. The method of claim 1, further comprising:
   providing a power electronics unit configured to receive power from the plurality of gensets and the energy storage unit; and
   matching a voltage magnitude, voltage phase and frequency of the power from the energy storage unit with a voltage magnitude, voltage phase and frequency of the power from the plurality of gensets.

4. The method of claim 1, further comprising a turbo compounding system associated with at least one of the plurality of gensets, each of the turbo compounding systems configured to increase fuel efficiency of the plurality of gensets.

5. The method of claim 1, wherein each of the plurality of gensets is run at an average load factor in a range of eighty percent to eighty five percent.

6. A micro-grid system, comprising:
   a plurality of gensets, when configured to run in parallel at a load factor of greater than sixty percent to service a load, configured for supplying power at any given time by enabling a minimum or less than minimum number of gensets capable of meeting a power demand imposed by the load;
   a turbo compounding system associated with at least one of the plurality of gensets, the turbo compounding system configured to increase fuel efficiency of the plurality of gensets; and
   an energy storage unit connected at least indirectly to the plurality of gensets, the energy storage unit configured to provide power to the load when the power demand exceeds the power supplied by the plurality of gensets.

7. The micro-grid system of claim 6, further comprising a power electronics unit connected at least indirectly to the plurality of gensets, the energy storage unit and the turbo compounding systems, the power electronics unit configured to match a voltage magnitude, voltage phase and frequency of the energy storage unit and the turbo compounding systems with a voltage magnitude, voltage phase and frequency of the plurality of gensets.

8. The micro-grid system of claim 6, wherein running each of the plurality of gensets at the load factor of greater than sixty percent provides fuel savings in a range of two percent to ten percent for every one of the plurality of gensets that is supplying power.

9. The micro-grid system of claim 6, further comprising a photo-voltaic unit configured to provide power to service at least a portion of the load.

10. The micro-grid system of claim 6, further comprising a wind power unit configured to provide power to service at least a portion of the load.

11. The micro-grid system of claim 6, wherein each of the plurality of gensets is run at an average load factor in a range of eighty percent to eighty five percent.

12. The micro-grid system of claim 6, wherein the energy storage unit comprises one or more of a battery, an ultra-capacitor and a flywheel.

\* \* \* \* \*